C. F. BURKHART.
DEMOUNTABLE RIM AND TIRE FASTENER FOR WHEELS.
APPLICATION FILED APR. 10, 1912.

1,051,079.

Patented Jan. 21, 1913.

3 SHEETS—SHEET 1.

WITNESSES
Leroy S. Hodges
W. Ray Taylor

INVENTOR
Charles F. Burkhart
BY Geyer & Popp
ATTORNEYS

C. F. BURKHART.
DEMOUNTABLE RIM AND TIRE FASTENER FOR WHEELS.
APPLICATION FILED APR. 10, 1912.

1,051,079.

Patented Jan. 21, 1913.

3 SHEETS—SHEET 2.

WITNESSES
Leroy S. Hodges
M. Ray Taylor

INVENTOR
Charles F. Burkhart
BY Geyer & Popp
ATTORNEYS

C. F. BURKHART.
DEMOUNTABLE RIM AND TIRE FASTENER FOR WHEELS.
APPLICATION FILED APR. 10, 1912.
1,051,079.
Patented Jan. 21, 1913.
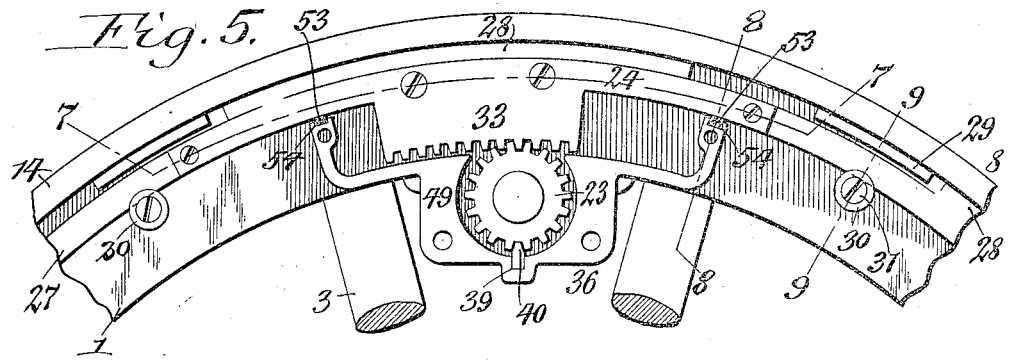
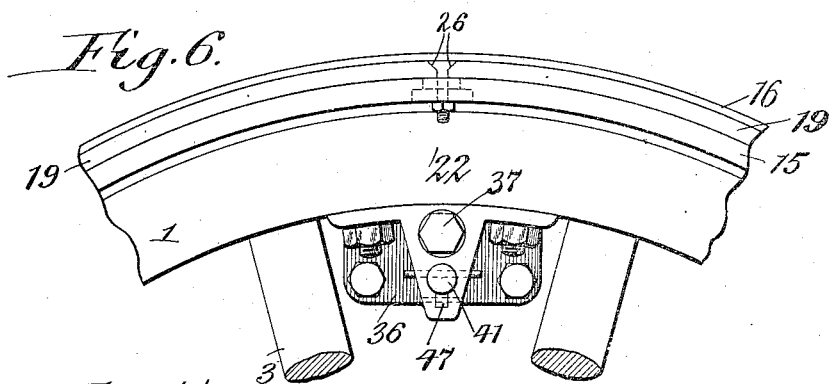
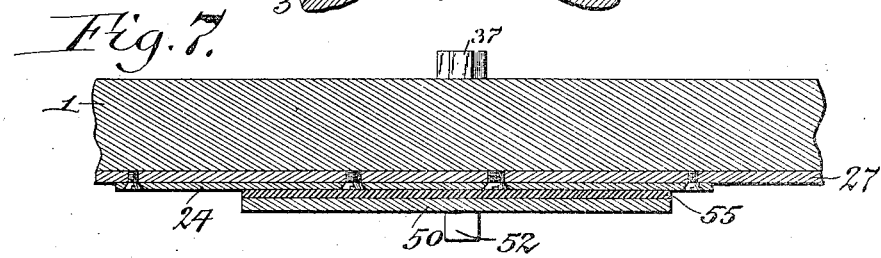
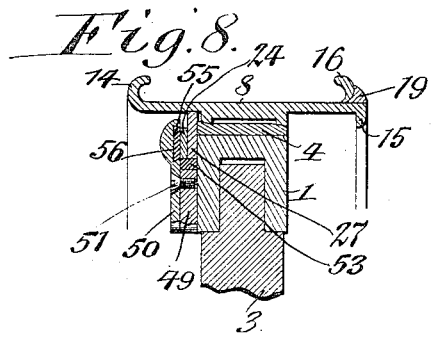
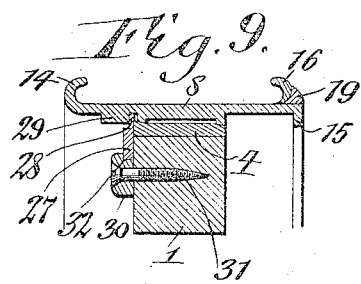
WITNESSES
Leroy S. Hodges
W. Ray Taylor
INVENTOR
Charles F. Burkhart
BY Leeper & Popp
ATTORNEYS

UNITED STATES PATENT OFFICE.

CHARLES F. BURKHART, OF NEW YORK, N. Y., ASSIGNOR TO WALTER J. REIMAN, OF BUFFALO, NEW YORK.

DEMOUNTABLE RIM AND TIRE-FASTENER FOR WHEELS.

1,051,079.

Specification of Letters Patent.  Patented Jan. 21, 1913.

Application filed April 10, 1912. Serial No. 689,722.

*To all whom it may concern:*

Be it known that I, CHARLES F. BURKHART, a citizen of the United States, residing at New York, in the county and State of New York, have invented new and useful Improvements in Demountable Rims and Tire-Fasteners for Wheels, of which the following is a specification.

This invention relates to improvements in means for fastening a tire to a wheel rim and also improvements in means for demountably attaching said rim to the felly of the wheel.

It is the object of this invention to provide means for permitting the tire to be attached to as well as removed from the rim more quickly and conveniently than has been possible heretofore and also to provide means for locking the demountable rim on the wheel which are of simplified construction, which are protected from moisture and dirt so that they are not liable to get out of order and which can be easily and conveniently manipulated when it is desired to apply the rim to or remove the same from the wheel.

Figure 1:
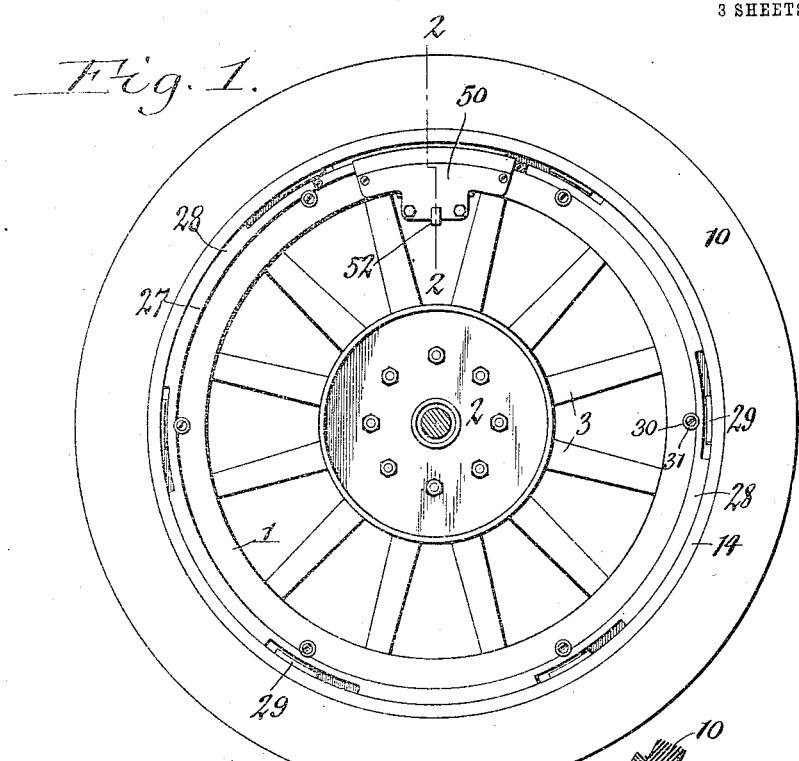
Figure 2:
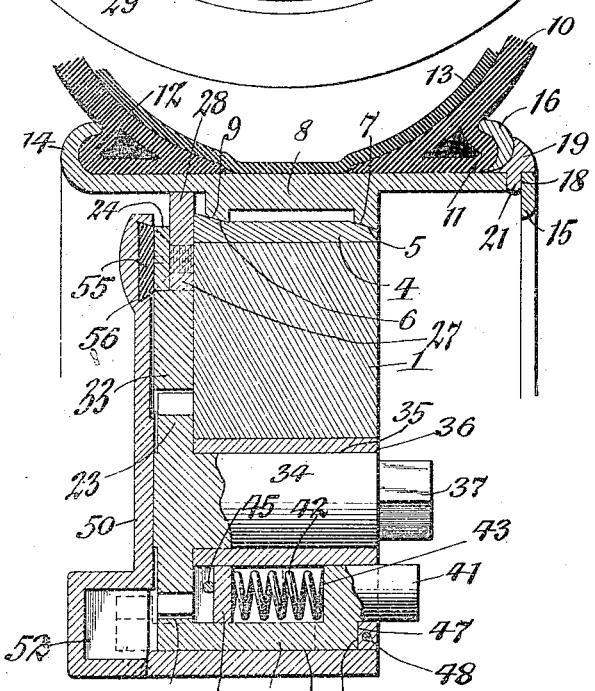
Figure 3:
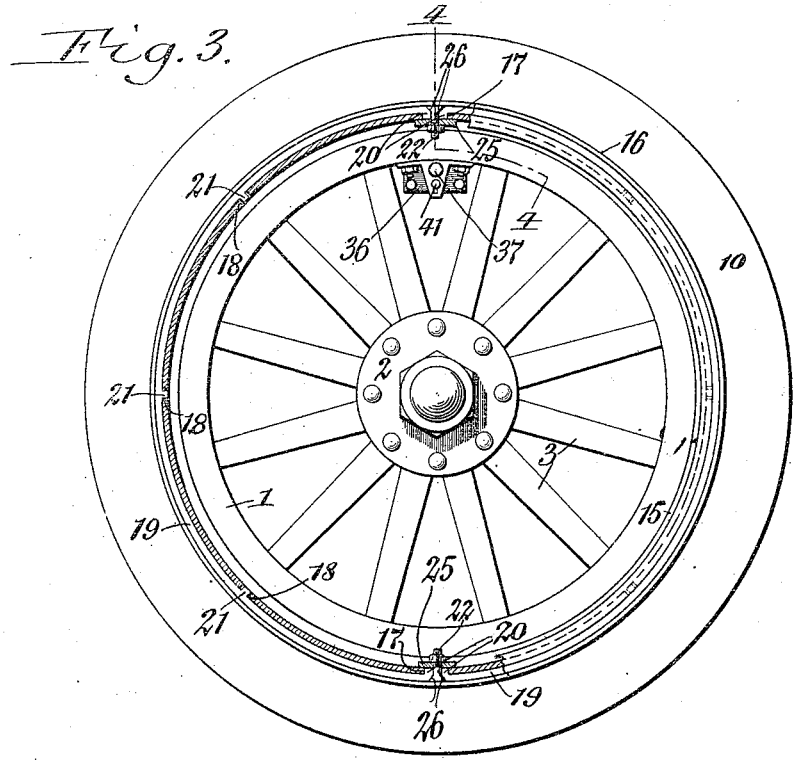
Figure 4:
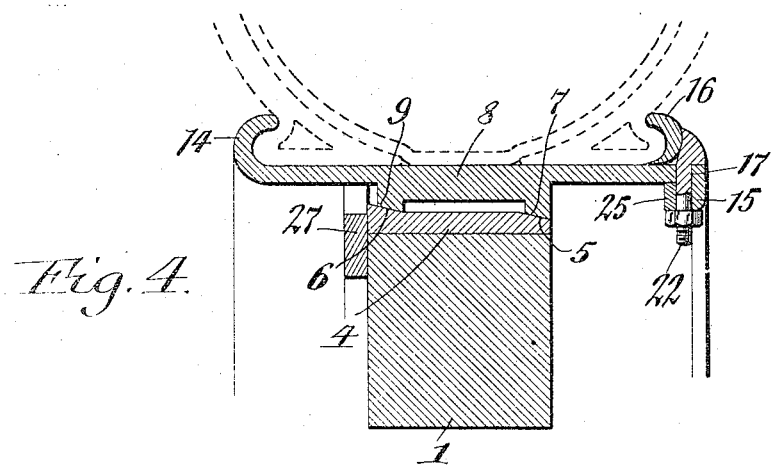

In the accompanying drawings consisting of three sheets: Figure 1 is a side elevation of a wheel embodying my improvements and viewed from the inner side thereof. Fig. 2 is a vertical transverse section, on an enlarged scale, taken in line 2—2, Fig. 1. Fig. 3 is a side elevation, partly in section, of the wheel embodying my improvements and viewed from the outer side thereof. Fig. 4 is a fragmentary cross section, on an enlarged scale, taken in line 4—4, Fig. 3. Fig. 5 is a fragmentary side elevation, on an enlarged scale, of the wheel viewed from the same side as Fig. 1 and showing the position of the parts when the demountable rim is removed therefrom and also showing the cover of the gear casing removed so as to expose the mechanism therein. Fig. 6 is a similar view of the wheel viewed from the same side as Fig. 3 but on a larger scale. Fig. 7 is a longitudinal section taken in line 7—7, Fig. 5. Figs. 8 and 9 are fragmentary cross sections taken in the correspondingly numbered lines in Fig. 5.

Similar characters of reference indicate corresponding parts throughout the several views.

In its general organization the wheel which is shown in the drawings for illustrating my improvements comprises a felly 1, a hub 2, spokes 3 connecting the felly and hub, a seat ring 4 of metal permanently secured to the periphery of the felly and provided on its outer side with two annular inclined faces or seats 5, 6, an outer removable or demountable rim 8 of metal provided on its inner side with two inclined annular faces or seats 7, 9 adapted to engage with the corresponding seats of the fixed inner ring, and a tire mounted on the outer side of the demountable rim and consisting of an outer shoe 10 of the usual crescent form in cross section having its opposite edges resting on the demountable rim and provided with outwardly projecting annular beads 11, 12 and an inflatable inner tube 13 engaging with the inner side of the shoe.

The demountable rim is provided at its inner or rear circumferential edge with an inwardly turned annular hook-shaped flange 14 which is adapted to engage with the bead at the rear or inner edge of the shoe for holding the same on the demountable rim. At its outer or front edge the demountable rim is provided with an inwardly projecting annular flange 15 for the purpose of stiffening this edge of the rim. Removably mounted on the outer side of the demountable rim adjacent to the outer edge thereof is a removable tire fastening ring 16 which is crescent-shaped in cross section and engages with the outer bead of the shoe for holding the same on the demountable rim. Between the fastening ring and the outer flange of the demountable rim an annular series of radial openings 17, 18 are formed in the body of the demountable rim which vary in number, eight of such openings being shown for example and two of them 17, 17 being comparatively long and arranged on diametrically opposite sides of the demountable rim while the remaining openings 18 are somewhat smaller and form in effect two sets of small intermediate openings which alternate with the large openings 17. The fastening ring 16 is endless and is held in place against outward or forward movement on the demountable rim by the means which embody one part of my invention. In its preferred form these means which hold the fastening ring in place comprise a tire locking ring which is split on diametrically opposite sides so as to form two sections 19, 19, each of which is of crescent form. Each of these sections of the locking ring is provided at its opposite ends with inwardly turned locking hooks or lugs 20 which engage with the two large locking openings or slots 17 in the demountable rim and between its ends this section is provided with three intermediate inwardly projecting locking lugs 21 each of which engages with one of the intermediate locking openings 18 of the demountable rim.

22, 22 represent two locking bolts each of which is arranged with its body radially between the opposing end locking lugs of the two locking ring sections and bears with the head at its outer end against the outer edges of these ring sections while the nut at the inner end thereof bears against the inner side of a bridge plate 25 which engages with the inner side of the demountable rim and extends across the adjacent large opening 17 thereof. The outer side of the head of this locking bolt is preferably flush with the periphery of the locking ring sections and the inner side of this head is preferably tapered inwardly and engages with correspondingly inclined faces 26 on the adjacent parts of the locking ring sections so that upon tightening the nut of this bolt the end lugs of these sections will be drawn tightly against opposite ends of the companion opening 17 in the demountable rim and thereby hold these parts securely in place.

When it is desired to remove the shoe of the tire the locking or clamping bolts 22 are first removed so as to release the locking ring sections. Each of these sections can now be moved laterally or outwardly so as to disengage its lugs from the demountable rim and thus free the fastening ring so as to permit the outer edge of the shoe to be disengaged from the demountable rim preparatory to removing the tire wholly from the demountable rim or only so much as is necessary for inspection or repairs.

By dividing the locking ring into a plurality of sections instead of splitting the same only at one point this ring can be removed from the demountable rim and also applied thereto without requiring the locking ring to be sprung unduly, thereby requiring less exertion and permitting the tire to be repaired much more easily and conveniently than is possible when employing a locking ring which is split only at one point, which is particularly important when the tire has been in use for some time and the locking ring has become rusted on the demountable rim. Furthermore, the employment of a locking ring constructed in sections in the manner described permits of utilizing the additional intermediate locking lugs whereby the locking ring is held on the demountable rim at more frequent intervals and thus holds the tire securely on the demountable rim all the way around which is particularly desirable in the case of automobiles which are used for touring or racing purposes and which are called upon frequently to make short or quick turns in the road at high speed.

The means for detachably securing the demountable rim to the felly comprise a locking ring 27 which is mounted on the inner or rear side of the felly so as to be capable of rotation circumferentially but incapable of moving axially and which is provided at its outer edge or periphery with a plurality of locking lugs 28 adapted to engage behind companion locking lugs 29 projecting inwardly from the adjacent inner part of the demountable rim. Although various means may be provided for thus mounting the locking ring 27 on the felly those shown in the drawings are suitable and comprise a plurality of hook-shaped bosses or collars 30 each of which is secured to the adjacent part of the felly by means of a screw 21 as shown or otherwise and provided on its outer side with a rabbet or guideway 32 upon which the adjacent part of the inner edge of the locking ring slides, as shown in Figs. 1, 5 and 9.

Upon sliding the demountable rim inwardly over the seat of the felly the locking lugs of the demountable rim pass through the space between the locking lugs of the locking ring 27 and inwardly beyond the same. This locking ring is then turned circumferentially sufficiently to bring its locking lugs in front of the lugs on the demountable rim, whereby the latter is locked in place on the felly and prevented from being withdrawn laterally outward or forward therefrom.

The turning movement of the rim locking ring is preferably effected by means which comprise a gear pinion 23 arranged along the inner side of the felly and meshing with a segmental gear rack 33 projecting inwardly from the rim locking ring. The gear segment is preferably formed separate from the rim locking ring and provided at its outer edge with an extension 24 which is secured to the outer side of said ring and forms practically a part thereof. This gear wheel or pinion is arranged on the inner or rear end of a horizontal spindle or shaft 34 which is journaled in a bearing 35 formed in a bracket 36 secured to the inner side of the adjacent part of the wheel felly. At its outer end this shaft is provided with means whereby the same may be turned which means, as shown in Figs. 2, 3 and 6, preferably consist of a flat sided shank 37 which is adapted to receive a wrench, key or crank of suitable construction for turning the shaft and the gear wheel.

Means are provided for positively holding the gear pinion and rim locking ring against turning when the wheel is in use.

These means are constructed in accordance with my invention and, as best shown in Figs. 2, 5 and 6, the same preferably comprise a horizontally movable slide 38 arranged to move parallel with the axis of the gear pinion and shaft in a guideway 39 formed in the inner part of a bracket 36 and provided at its inner end with an outwardly projecting locking tooth 40 which normally engages in the space between two adjacent teeth on the inner side of the gear pinion. At its inner end the slide is provided with an offset shifting tappet or stud 41 which projects forwardly or outwardly from the bracket adjacent to the wrench or key shank of the gear pinion. The locking slide is yieldingly held in its outermost position in which its locking tooth engages with the gear pinion by means of a spring 42 arranged in the upper part of the guideway and bearing at its outer end against a shoulder 43 formed at the inner end of the offset stud while the inner end of the spring bears against an abutment block 44 which is secured in the guideway above the slide by means of a pin 45 passing through the bracket behind the abutment block, as shown in Fig. 2. The outward or forward movement of the slide is limited by a shoulder 46 formed at the front end thereof and engaging with a stop formed on the bracket by means of a stop block 47 secured to the bracket at the front end of the guideway by means of a pin 48. While the slide is in a position in which its locking tooth engages with the gear pinion the stud or tappet thereof projects forwardly beyond the front face of the bracket, as shown in Fig. 2. Upon applying a wrench preferably of the socket type to the shank of the gear shaft preparatory to turning the latter this wrench during such application engages with the tappet and pushes the same together with the locking slide and tooth inwardly to such an extent that the locking tooth is moved out of engagement from the gear pinion, as shown by dotted lines in Fig. 2, thereby releasing this pinion and permitting the same to be turned by the wrench for operating the rim locking ring. Upon removing the wrench from the shank of the pinion shaft the spring automatically shifts the locking slide outwardly or forwardly so that the locking tooth of the latter reëngages with the adjacent teeth of the gear pinion and thereby prevents unintentional turning of the same as well as the rim locking ring, whereby accidental disengagement of the demountable rim from the felly is prevented. By thus providing a locking slide with a tooth which engages directly with the gear pinion the construction is simplified and greater security is obtained.

For the purpose of protecting the gearing and locking devices against interference by moisture and dirt the same are inclosed and for this purpose a casing is provided which comprises a side wall 49 formed on the inner side of the bracket around the gear pinion and rack and terminating at its ends adjacent to the inner side of the rim locking ring at opposite ends of the gear rack, and a removable cover or plate 50 which is detachably secured to the rear edge of the wall by means of screws 51 or otherwise and extends over the rear side of the gear wheel, and the gear rack. The inner part of the plate of the inclosing casing is provided with a pocket 52 which receives the toothed inner end of the slide in the rearmost position of the same when the gear wheel is unlocked.

For the purpose of producing a dust tight joint between the inclosing casing and the rim locking ring means are arranged between the ends of the wall and the rim locking ring which means may consist of packings 53 of leather or similar material seated in dove-tail pockets 54 formed in the ends of the wall and engaging with the inner side of the rim locking ring, as shown in Figs. 5 and 8. A dust tight joint is also produced between the outer portion of the cover or plate and the outer side of the rim locking ring adjacent to the gear segment this being preferably effected by means of a packing 55 of curved form which is preferably constructed of leather, felt or similar material and seated in a curved dove-tail recess 56 formed on the inner side of the cover plate and engaging with the adjacent outer surface of the rim locking ring, as shown in Figs. 2 and 7. By this means water, dust and dirt are effectually excluded from the interior of the housing or casing which incloses the gearing and locking devices and thereby keeps these parts at all times in a condition in which they can be operated properly.

I claim as my invention:

1. The combination of a wheel having a felly provided with a seat, a tire supporting rim engaging with said seat and provided with an annular row of locking lugs, a locking ring rotatably supported on the felly and provided with a plurality of locking lugs adapted to engage the lugs of the rim and also provided with a gear rack, a shaft journaled in a bearing on the felly and provided at one end with a wrench shank and at its other end with a gear pinion meshing with said rack, and a slide guided in a way on the felly and having a stud at one end adjacent to said wrench shank while its opposite end is provided with a locking tooth adapted to engage with the teeth of said gear pinion.

2. The combination of a wheel having a felly provided with a seat, a tire supporting rim engaging with said seat and provided with an annular row of locking lugs, a locking ring rotatably supported on the felly and provided with a plurality of locking lugs adapted to engage the lugs of the rim and also provided with a gear rack, a shaft journaled in a bearing on the felly and provided at one end with a wrench shank and at its other end with a gear pinion meshing with said rack, a slide guided in a way on the felly and having a stud at one end adjacent to said wrench shank while its opposite end is provided with a locking tooth adapted to engage with the teeth of said gear pinion and a spring operating to shift said slide in a direction for engaging its tooth with said pinion.

3. The combination of a wheel having a felly provided with a seat, a tire supporting rim engaging with said seat and provided with an annular row of locking lugs, a locking ring rotatably supported on the felly and provided with a plurality of locking lugs adapted to engage the lugs of the rim and also provided with a gear rack, a gear pinion engaging with said rack, a bracket mounted on said felly and pivotally supporting said pinion and having a casing which incloses said gear rack and pinion, and which comprises a side wall arranged on said bracket around the gear pinion and having its ends arranged adjacent to the inner edge of said locking ring on opposite sides of said gear rack and a plate secured to said wall and arranged over said gear rack, pinion and the adjacent part of the locking ring, a packing arranged between the ends of said wall and the inner edge of the locking ring, and a packing arranged between the inner side of said plate and the outer side of said locking ring.

Witness my hand this 4th day of April, 1912.

CHARLES F. BURKHART.

Witnesses:
 WALTER J. REIMAN,
 THEO. L. POPP.

---

Copies of this patent may be obtained for five cents each, by addressing the "Commissioner of Patents, Washington, D. C."